United States Patent [19]

Gauthier

[11] 4,427,717

[45] Jan. 24, 1984

[54] PROCESS FOR PRODUCING AN OBJECT WITH A CHIRALIC STRUCTURE OBTAINED FROM A SHAPEABLE MATERIAL SOURCE

[75] Inventor: Francis Gauthier, Paris, France

[73] Assignee: Thomson-CSF, Paris, France

[21] Appl. No.: 425,994

[22] Filed: Sep. 28, 1982

[30] Foreign Application Priority Data

Nov. 3, 1981 [FR] France ................................ 81 20596

[51] Int. Cl.$^3$ .......................... G02B 1/10; G02B 5/14; B05D 3/12; B05D 1/36
[52] U.S. Cl. ...................................... 427/163; 65/3.11; 264/1.3; 264/1.5; 427/160
[58] Field of Search ................... 65/3.11; 264/1.3, 1.5; 427/160, 163

[56] References Cited

U.S. PATENT DOCUMENTS 4,028,081  6/1977  Marcatili .................................. 65/2
4,308,045  12/1981  Miller ................................... 65/3.11

*Primary Examiner*—James R. Hoffman
*Attorney, Agent, or Firm*—Cushman, Darby & Cushman

[57] ABSTRACT

The invention relates to a production process consisting in a first variant of drawing, stranding and hardening the object in a simultaneous manner before coating it with a product for forming an envelope making it possible to fix the twisting or torsion of said object. According to a second variant the drawing and hardening stages are performed before the twisting and coating stages.

7 Claims, 9 Drawing Figures

FIG.1
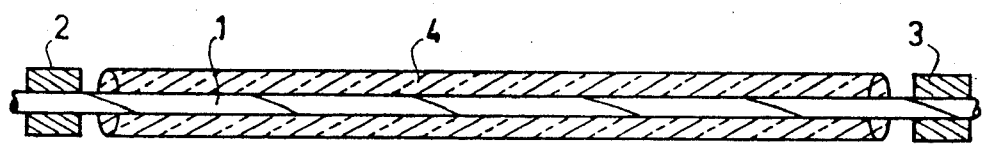
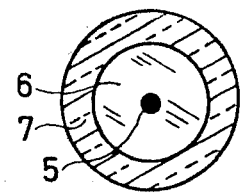
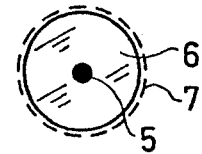
FIG.2    FIG.3
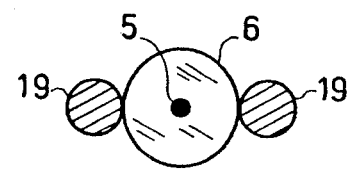
FIG.6

PROCESS FOR PRODUCING AN OBJECT WITH A CHIRALIC STRUCTURE OBTAINED FROM A SHAPEABLE MATERIAL SOURCE

BACKGROUND OF THE INVENTION

The present invention relates to a process for producing an object from a shapeable material source, for example a viscous or plastic source and having a chiralic structure, as well as to a device for performing this process.

Throughout the remainder of the description the object formed by drawing or any other process will be called a "fibre", but this term does not constitute a limitation to optical fibres.

The monomodal fibres conventionally produced for telecommunications always have a small quantity of linear birefringence and circular birefringence. As a result these fibres retain neither the linear polarization, nor the circular polarization. The fibre can be given a high level of linear birefringence by breaking the circular symmetry to the benefit of a planar symmetry. It is also possible to consider a reverse method consisting of introducing a high circular birefringence, so as to retain the circular polarization.

One solution for producing this circular polarization consists of subjecting the glass fibre to a static torsional stress, e.g. applied externally by twisting between its two ends. One effect of the twisting of the fibre is to introduce circular birefringence into it.

BRIEF SUMMARY OF THE INVENTION

The present invention relates to a process making it possible to retain a state of torsion by means of an envelope acting as a hoop or ferrule. It makes it possible to obtain a fibre with a helical or chiralic structure. However, this fibre can have a random cross-section, so that it can have a complex geometry.

If consideration is given to a fibre having a helical symmetry, whereof one production process forms the subject matter of copending U.S. patent application Ser. No. 424,293 filed Sept. 27, 1982 and entitled: "Process for obtaining an object with a chiralic structure resulting from drawing from a softened material source and device for performing this process", it is possible to obtain a fibre, whose properties and structures will be better controlled and which does not have a certain number of the deficiencies inherent in the prior art. This process consists of twisting the object during its drawing and simultaneously hardening it, which makes it possible to fix part of the thus obtained stresses.

A fibre obtained by drawing and stranding after its solidification can have a static fatigue, i.e. it can age and possible microcracks can therefore propagate in its internal structure and can finally lead to the fracture of the object.

To obviate this disadvantage the invention provides for the coating of the fibre with a thermosetting material, which makes it possible to fix the initial state of the fibre and protect it from the mechanical and chemical effects of the invironment.

The present invention specifically relates to a process for producing an object having a chiralic structure obtained by drawing from a shapeable material source and comprising the stages of drawing the object from said material source forming a drawing volume, twisting the object around the drawing axis, hardening the object by cooling the part thereof between the source and the cooled part thereof, coating the object with an object forming an envelope and solidifying the envelope around the object, so as to fix the state of torsion thereof.

The invention also relates to a production device using such a process.

BRIEF DESCRIPTION OF THE DRAWINGS

The invention is described in greater detail hereinafter relative to non-limitative embodiments and the attached drawings, wherein show:

FIG. 1 diagrammatically the process according to the invention.

FIG. 2 a particular aspect of a prior art process.

FIG. 3 a particular aspect of the production process according to the invention.

FIG. 6 a variant of a particular aspect of the production process according to the invention.

DETAILED DESCRIPTION OF THE PREFERRED EMBODIMENTS

Figure 4:
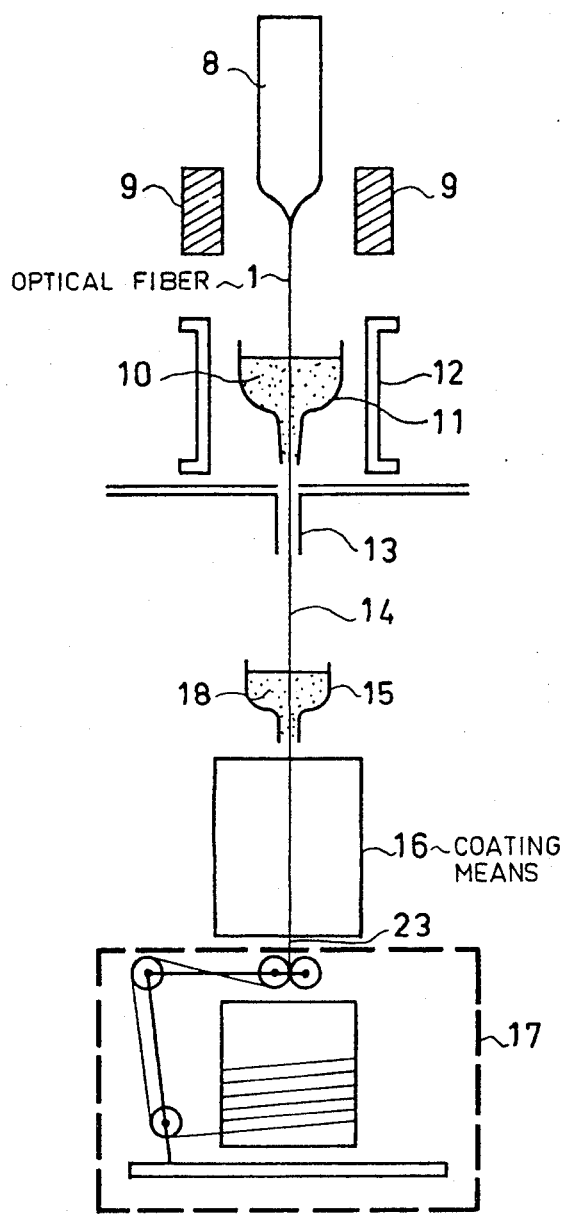
FIG. 4 the production process according to the invention.

On the basis of a stranded helical fibre and the machine making it possible to produce this fibre, as described in copending U.S. patent application Ser. No. 424,293 filed Sept. 27, 1982 and entitled: "Process for obtaining an object with a chiralic structure resulting from drawing from a softened material source and device for performing this process", the following means is proposed for obtaining a fibre retaining the circular polarization.

On considering an already produced fibre, starting e.g. with a preform or blank, and by simple drawing, on twisting a large number of turns whilst holding it at its two ends, it is merely a question of "immobilizing" it to ensure that it retains its polarization properties by means of a rigid hoop, fitted e.g. in accordance with FIG. 1. FIG. 1 illustrates diagrammatically the process according to the invention. It shows an already produced fibre, which has then been tested, whilst being held at its ends 2 and 3. A rigid hoop 4 is then connected in order to immobilize it.

According to the process of the invention, to bring about this retaining action by means of a hoop or ferrule, it is proposed to coat the stranded fibre, during or after its production, with a material which fixes the stranded state of the fibre during solidification.

Thus, through coating the fibre once it has already been stranded simultaneously makes it possible to protect it, fix the torsion which has been produced therein, prevent the ageing of the material by applying radial stresses to it and prevent possible cracks from developing.

This coating can be of glass, vitro-ceramic, plastic or even metal. The advantage of a glass coating is that there is chemical and mechanical compatibility between the stranded fibre and the envelope or hoop deposited on its surface, which prevents ageing. Moreover, the hardened cooled glass has a very long relaxation time, which makes it possible to prevent any mechanical loosening of the coated fibre and in this way the rotatory power of the fibre is retained.

FIG. 2 shows a cross-section of a conventional monomodal fibre blank obtained by the gaseous chemical deposition method, called M.C.V.D. It consists of a core 5, an optical sheath 6 and a mechanical sheath 7 constituted by the initial tube.

FIG. 3 shows a blank for coating in accordance with the present invention. The mechanical sheath 7 has been partly or totally removed.

For example a fibre can be produced from a blank obtained by the M.C.V.D. method, the initial silica tube being dissolved with hydrofluoric acid in order to increase the torsion and polarization effect.

On fibring and stranding this blank without a mechanical sheath, according to the process of the invention, the glass covering process leads to the re-forming of a mechanical sheath, which will also indefinitely retain the twisting of the guiding part and its polarizing optical qualities. To achieve this the fibre is introduced into a melted glass coating device.

The composition of the enveloping glass is chosen so as to ensure a good adhesion to the optical sheath or what is left of the silica mechanical sheath, together with a radial compressive stressing of the fibre during the cooling of the envelope glass, which will ensure that the fibre is insensitive to the external environmental and conditioning stresses and strains. To this end a glass or a vitro-ceramic with a high expansion coefficient is used.

Various methods exist for producing optical fibres. The so-called double crucible method starts with molten material, which is stretched into the form of a fibre. The other production processes give an intermediate stage, e.g. the process starting from a blank produces the fibre to within a homothetic transformation. In a non-limitative manner, consideration will be given to a process of this type for the purpose of explaining the process according to the invention.

FIG. 4 illustrates the different elements of a fibre formation machine using the process according to the invention. These various elements are as follows. A preform or blank 8 positioned within the melting means 9, which can be a blowpipe, a Joule effect furnace, a high, medium or low frequency induction furnace or the like is the source of fibre 1. These melting means 9 soften the blank 8. The material starts to flow and a fibre 1 is obtained by drawing and twisting. Generally the type of blank used is like that shown in FIG. 3.

A coating device 11 containing, for example, molten glass 10 melted by means 12 makes it possible to coat fibre 1, which is stranded during its production. Hardening means 13 are able to store the state of the fibre 1, whilst solidifying the coating material.

The stranded and coated fibre is obtained at 14. 15 and 16 are the means for coating the fibre in order to protect it. The coating can be e.g. an epoxy resin or metal coating. 17 is a fibre formation device making it possible to draw and strand the fibre during production.

Figures 8, 9:
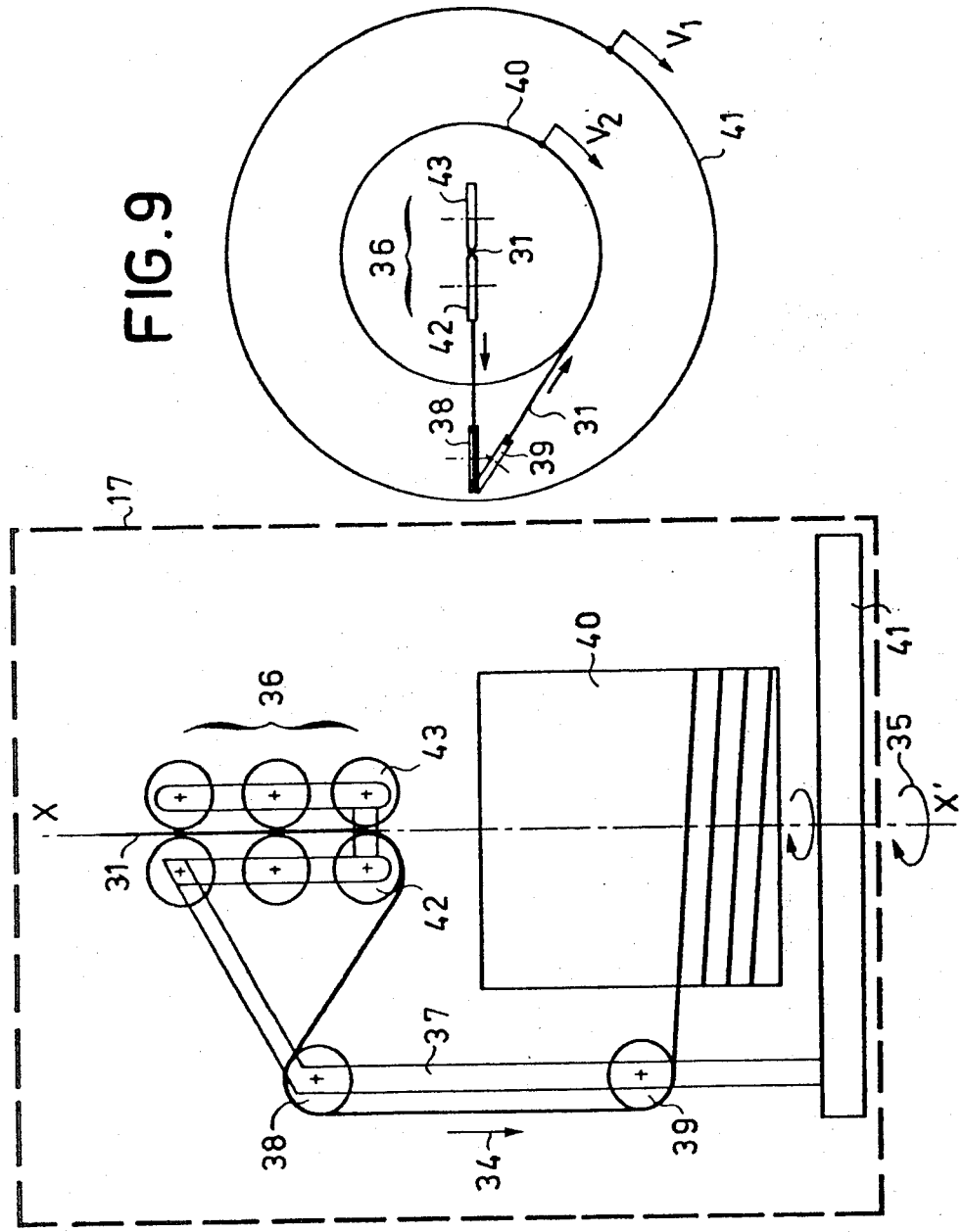
FIGS. 8 and 9 means for drawing and twisting the fibre.

Device 17, which corresponds to the aforementioned patent application, is shown in FIGS. 8 and 9. FIG. 8 is a side view of this device, the fibre being drawn vertically from top to bottom and coiled horizontally, within the non-limitative scope of this embodiment. FIG. 9 is a projection view along the drawing and rotation axis, viewed from the fibre formation side.

In accordance with FIGS. 8 and 9, fibre 31 from the not shown shaping means is gripped in rollers 42, 43 of holding device 36 between which it passes and is then deflected towards pulleys 38, 39. Pulley 39 can be moved in translational manner to ensure the transfer of the fibre to the vertically axed winding drum 40. The group of rollers of device 36 and guide pulleys 38 and 39 is integral with a plate 41, whose rotation axis XX' is vertical and coincides with the drawing axis XX' of fibre 31 on leaving the shaping means. The rotation axis of the drum also coincides with axis XX'. This case will be considered throughout the remainder of the description, although it could differ in other constructional embodiments. The rotation of the assembly formed by gantry 37 supporting the pulleys and rollers, as well as plate 41 ensures the twisting of the fibre, whilst the rotation of drum 40 ensures drawing and winding.

Rollers 42 and 43 can be replaced by any other gripping device permitting the drawing of the fibre. They can be coated with a layer of antislip material, such as an elastomer rubber, silicone, neoprene, etc., in order to ensure a good adhesion to the fibre.

The guide pulleys 38, 39, fixed to the rotary gantry makes it possible to wind the fibre on to the central drum 40. If drum 40 and the plate 41-gantry 37 assembly rotate at the same speed, fibre 31 is not wound on to drum 40. However, if drum 40 is kept stationary, one winding turn of fibre 31 on to drum 40 corresponds to one twisting turn of the said fibre. However, the desired result is to obtain a large number of fibre turns per meter.

In addition, if plate 41 rotates at a speed $V_1$, it twists the fibre at the same angular velocity. In order to be able to adjust the number of turns per meter of fibre produced, the speed $V_2$ of drum 40 is chosen, which makes it possible to determine in this way the winding speed $v = V_1 - V_2$ (or fibre formation speed if expressed linearly).

As a result of the means according to the invention, it is possible to produce fibres having fixed between 1 and 1000 twisting turns per meter. The fibre formation rates can be set at between 1 and 100 m/min. It is possible to fix a considerable proportion of the stresses, due to the shear by twisting, which creates an optical rotatory power in the fibre.

Thus, to start the process, fibre 1 is drawn and stranded by means of device 17 described hereinbefore. The fibre is then passed through the coating cone 11 containing e.g. molten glass 10. Consideration is given to a glass having a high expansion hardening, a significant retraction on the stranded fibre. The external stresses are generally negligible compared with the diametral stresses applied by the hoop or envelope and the coated fibre is insensitive to the medium.

If the envelope product 10 is glass or vitro-ceramic, it is then possible to produce a second coating, from coating device 15, of a protective material 18, which can be plastic or metal.

In the case of a metal or plastic envelope, it is also possible to produce a single thick coating. The plastic in question has a relatively high modulus of elasticity.

In FIG. 4 a single hardening means is shown at 13, but there can also be such a means at the outlet from furnace 9, when the fibre has been stranded in order to fix the state of the fibre.

The hardening means in question can be e.g. a water curtain, a cold radiating panel or a cold gas flow. This can be atmospheric air in the case e.g. of a glass coating.

16 is a device permitting the solidification of the protective coating of material 18 applied by coating device 15. For example in the case of a plastic envelope, this can be a polarisation, particularly with ultra-violet rays. The end fibre obtained 23 has a structure like that described in FIG. 7.

In FIG. 6, two bars 19, e.g. of silica, are welded on either side of the blank. By homothetic transformation during fibre formation, it is thus possible to obtain a fibre having the same elements. The blank and fibre can have identical or slightly different geometries, as a function of the melting conditions chosen.

The blank of FIG. 6, fibred by drawing in accordance with the prior art, would give a fibre having a plane of symmetry enabling the retention of the linear polarization. Once stranded, a linear polarization is obtained, which is twisted. Experience has shown that it is possible to fibre such composite blanks.

Fibre 1 is coated to fix this stranded state making it possible to retain the polarization with an envelope glass 10 using coating device 11.

The thickness of the glass envelope is controlled by adjusting the viscosity of glass 10 (function of the temperature), and the dynamics of fibre formation.

The helica glass lining of a blank, like that described in FIG. 6, adds to the stress effects due to twisting, those due to different expansion coefficients of the glasses present, thereby breaking the axial symmetry of fibre 14. The rectilinear glass lining of such a composite blank will give a fibre retaining the linear polarization.

One means for increasing the torsion is to simultaneously turn the blank 8, if this proves to be necessary. It is possible to obtain a very large number of turns (200/meter) on the fibre, because this torsion is immediately fixed without there being any risk of fracture by ageing and the development of microcracks.

Figure 5:
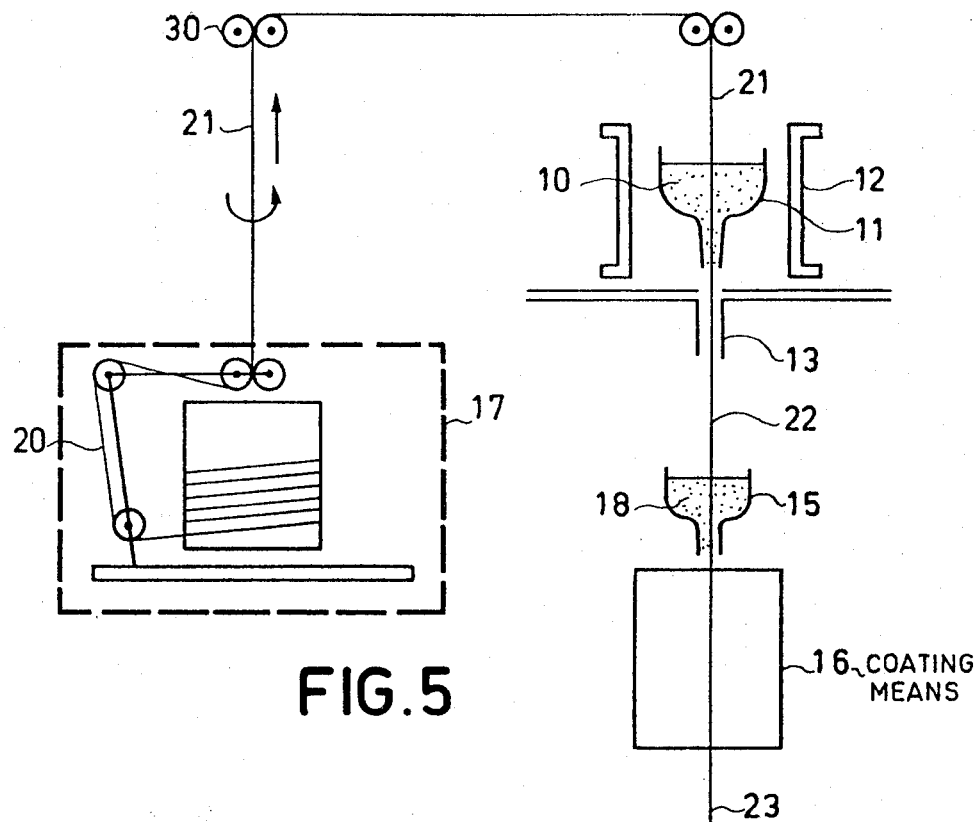
FIG. 5 a variant of the production process according to the invention.

FIG. 5 illustrates a variant of the production process according to the invention. On to the vertical drum of assembly 17 has been wound a fibre obtained e.g. from a blank, like that shown in FIG. 3, by drawing. Assembly 17 makes it possible to unwind fibre 20, so as to obtain by gripping in device 30 a stranded fibre 21, which enters coating device 11 filled with a coating product 10, preferably glass for the aforementioned reasons, said glass being melted by heating means 12. Pressing device 30 prevents the fibre from turning on itself and can be constituted by pulleys, rollers, etc. On leaving coating device 11, the envelope glass applied to the fibre is hardened by hardening means 13 in order to give a hooped fibre 22.

This fibre can be protected by coating means, such as coating device 15, its coating product 18 and treatment means 16. A fibre with a chiralic structure 23 is obtained, which is wound on to a drum by conventional drum winding and transfer means 19.

Figure 7:
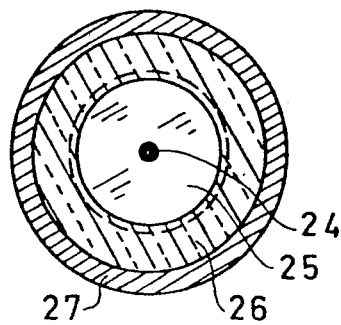
FIG. 7 the structure of the fibre obtained by this process.

The fibre obtained from a blank like that of FIG. 3 is shown in FIG. 7. The actual stranded fibre is constituted by a core 24 and a sheath 25 having the properties of a chiralic structure. It is hooped by a glass envelope 26, itself protected by a protective sheath 27.

The fibres obtained in this way by the process of the invention can be used in the production of optical sensors, e.g. electric current sensors.

What is claimed is:

1. A process for producing an object having a helical structure comprising the steps of: (a) drawing the object along a drawing axis from a shapeable material source to form a drawing volume; (b) twisting the object around the drawing axis; (c) hardening the object by cooling the part thereof between the source and the cooled part thereof; (d) coating the object with a coating material to form an envelope; and (e) solidifying the envelope around the object, so as to fix the state of torsion thereof.

2. A process according to claim 1, wherein steps (a), (b) and (c) are performed simultaneously prior to step (d).

3. A process according to claim 1, wherein steps (a) and (c) are performed simultaneously before step (b).

4. A process according to claim 1, wherein the coating material forming the envelope is glass.

5. A process according to claim 1, wherein the coating material forming the envelope is vitro-ceramic.

6. A process according to claim 1 further comprising the step of (f) coating the object having an envelope formed thereon according to step (d) with a second coating material to form a protective sheath.

7. A process according to claim 6, wherein the second coating material forming the protective sheath is metal.

* * * * *